United States Patent [19]

Stuart et al.

[11] Patent Number: 5,641,135
[45] Date of Patent: Jun. 24, 1997

[54] INFLATABLE TORUS AND COLLAPSIBLE HINGED DISC SPACECRAFT DESIGNS FOR SATELLITE COMMUNICATION SYSTEM

[75] Inventors: James R. Stuart, Louisville, Colo.; David Palmer Patterson, Los Altos, Calif.

[73] Assignee: Teledesic Corporation, Kirkland, Wash.

[21] Appl. No.: 238,568

[22] Filed: May 5, 1994

Related U.S. Application Data

[63] Continuation-in-part of Ser. No. 931,625, Aug. 18, 1992, Pat. No. 5,386,953, which is a continuation of Ser. No. 790,748, Nov. 8, 1991, abandoned.

[51] Int. Cl.$^6$ .................. B64G 1/22; B64G 1/44; H01L 31/045
[52] U.S. Cl. .................. 244/173; 244/158 R; 136/245; 136/292
[58] Field of Search .................. 244/158 R, 173; 136/244, 245, 292

[56] References Cited

U.S. PATENT DOCUMENTS

| | | | |
|---|---|---|---|
| 3,733,758 | 5/1973 | Maier et al. | 244/173 |
| 4,148,163 | 4/1979 | Chenin et al. | 249/173 |
| 4,588,151 | 5/1986 | Mori | 244/173 |
| 4,725,025 | 2/1988 | Binge et al. | 244/158 R |
| 4,988,060 | 1/1991 | Janson et al. | 244/173 |
| 5,044,579 | 9/1991 | Rochefort | 244/158 R |
| 5,052,640 | 10/1991 | Chang | 244/173 |
| 5,131,955 | 7/1992 | Stern et al. | 244/173 |
| 5,196,857 | 3/1993 | Chiappetta et al. | 244/173 |
| 5,199,672 | 4/1993 | King et al. | 244/158 R |
| 5,319,905 | 6/1994 | Szirtes | 244/173 |
| 5,386,953 | 2/1995 | Stuart | 244/158 R |

FOREIGN PATENT DOCUMENTS

| | | | |
|---|---|---|---|
| 0134288 | 9/1983 | Germany . | |
| 0260442 | 8/1987 | Germany . | |
| 2-99498 | 4/1990 | Japan | 244/173 |
| 2-133300 | 5/1990 | Japan | 244/173 |
| 3-235800 | 10/1991 | Japan | 244/173 |
| 4-321496 | 11/1992 | Japan | 244/158 R |
| WO93/09578 | 5/1993 | WIPO . | |
| 9309029 | 5/1993 | WIPO | 244/159 R |

OTHER PUBLICATIONS

1991 IEEE National Radar Conference; "A Space–Fed Phased Array for Surveillance from Space" by Hightower et al.; pp. 41–45.

*Primary Examiner*—Andres Kashnikow
*Assistant Examiner*—Virna Lissi Mojica
*Attorney, Agent, or Firm*—Anglin & Giaccherini

[57] ABSTRACT

A series of spacecraft designs (10, 42 and 52) for a Satellite Communication System is disclosed. One of the preferred embodiments of the invention called "Gearsat™" (10) comprises a hollow torus which inflates when it reaches orbit. When viewed from the side along its circumference, Gearsat (10) looks like two flattened pyramids sharing a common base. Phased array antenna panels (14) are deployed across the top of the pyramid along an exterior cylindrical surface (12), while twin arrays of solar cells (16) cover the slanted surfaces. The satellite (10) rotates about its center, and individual antenna panels (14) are spatially synchronized to transmit and receive signals from particular regions on the ground. An alternative embodiment, called "Batsat™" (42, 52), includes a central cylindrical body (B) and a plurality of substantially circular linked antenna and solar/thermal panels (A1–A9 and S1 and S2) which carry individual antennas (X) and solar/thermal surfaces (Y). All of the embodiments (10, 42 and 52) are capable of being nested or stacked in a compact arrangement that fit within the payload bay of a launch vehicle (L).

20 Claims, 14 Drawing Sheets

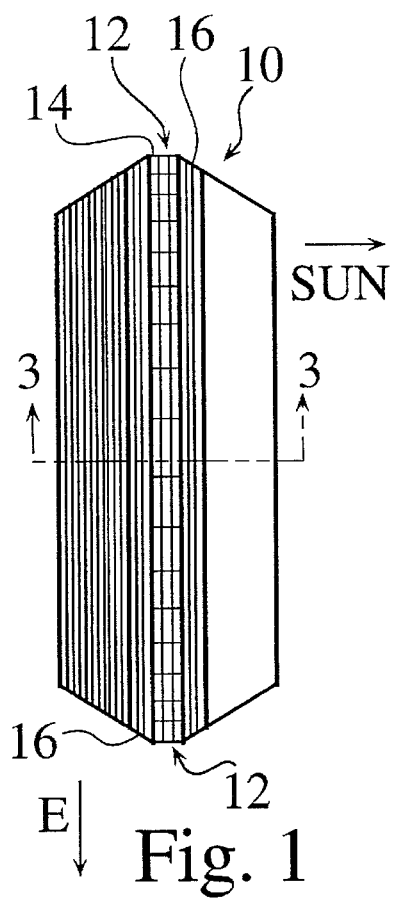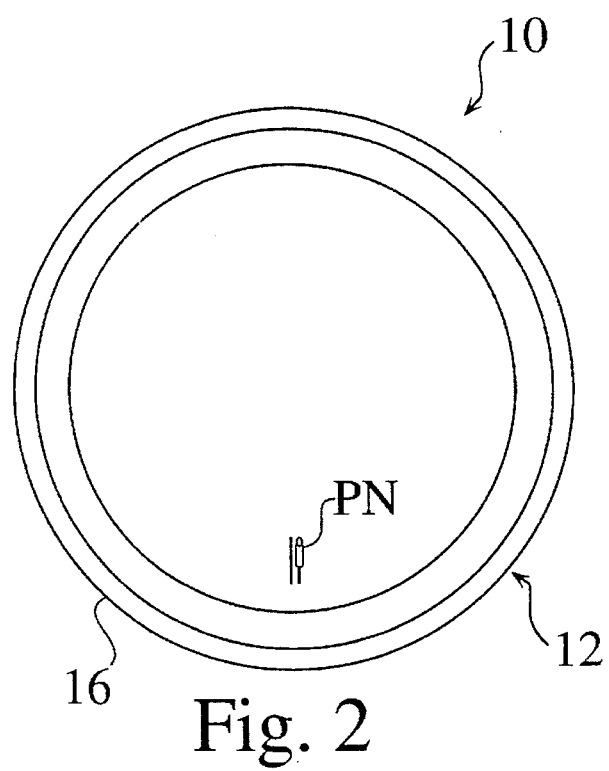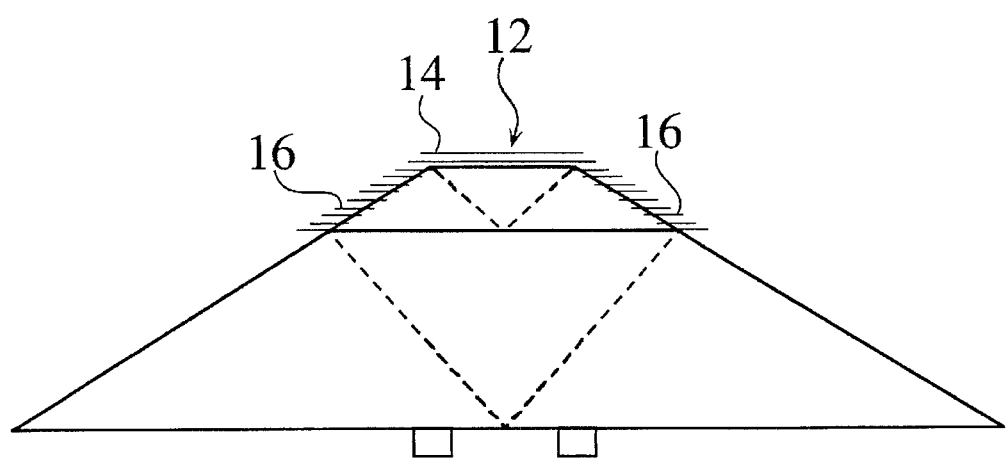
Fig. 1
Fig. 2
Fig. 3

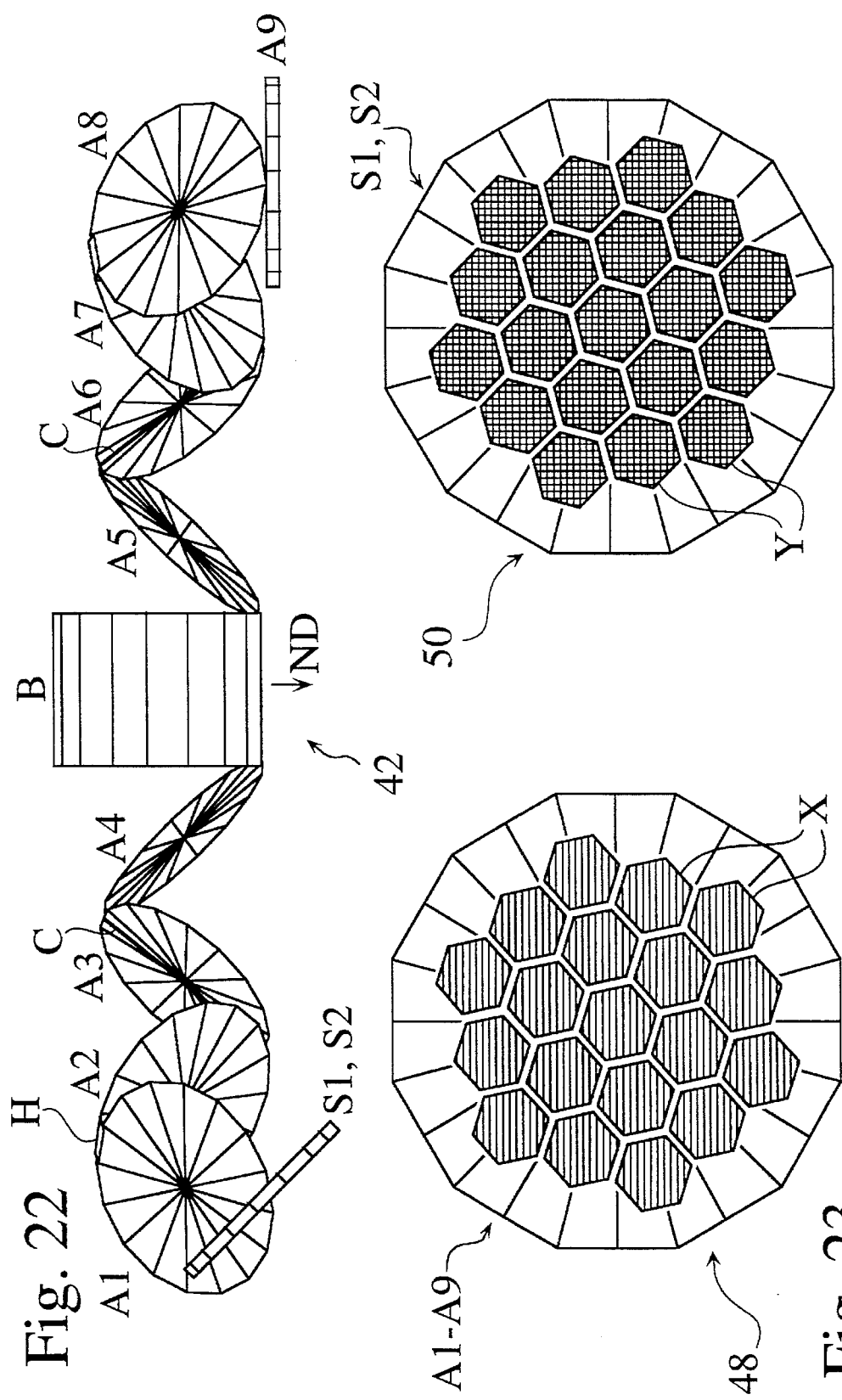

INFLATABLE TORUS AND COLLAPSIBLE HINGED DISC SPACECRAFT DESIGNS FOR SATELLITE COMMUNICATION SYSTEM

CLAIM FOR PRIORITY

The present application is a Continuation-in-Part Patent Application. The Applicants hereby claim the benefit of priority under Section 120 of Title 35 of the United States Code of Laws for any and all subject matter which is commonly disclosed in the present application and in a pending patent application by James R. Stuart, filed on Aug. 18, 1992 and assigned U.S. Ser. No. 07/931,625 now U.S. Pat. No. 5,386,953, which claims the benefit of priority of a parent application entitled *Spacecraft Designs for Satellite Communication System* by James R. Stuart filed on Nov. 8, 1991 and assigned U.S. Ser. No. 07/790,748 now abandoned.

CROSS-REFERENCES TO RELATED PATENT APPLICATIONS

The present patent application is related to the following commonly-owned and commonly-assigned pending patent applications:

*Satellite Communication System* by Edward Fenton Tuck et al., filed on 28 Feb. 1994 and assigned U.S. Ser. No. 08/203,140, and claiming the benefit of priority of a parent application entitled *Satellite Communication System* by Edward F. Tuck et al., filed on 28 Oct. 1991, and assigned U.S. Ser. No. 07/783,754;

*Terrestrial Antennas for Satellite Communication System* by Asu Ram Jha, filed on 02 Dec. 1993 and assigned U.S. Ser. No. 07/984,609, and claiming the benefit of priority of a parent application entitled *Terrestrial Antennas for Satellite Communication System* by Asu Ram Jha, filed on Nov. 8, 1991, and assigned U.S. Ser. No. 07/790,273;

*Switching Methods for Satellite Communication System* by David Palmer Patterson & Moshe Lerner Liron, filed on Nov. 8, 1991 and assigned U.S. Ser. No. 07/790,805;

*Beam Compensation Methods for Satellite Communication System* by David Palmer Patterson and Mark Alan Sturza, filed on 08 Jul. 1993 and assigned U.S. Ser. No. 08/088,714, and claiming the benefit of priority of a parent application entitled *Earth Fixed Cells Beam Compensation for Satellite Communication System* by David P. Patterson and Mark Alan Sturza, filed on Nov. 8, 1991 and assigned U.S. Ser. No. 07/790,318;

*Spacecraft Antennas & Beam Steering Methods for Satellite Communication System* by Douglas Gene Lockie, filed on Oct. 28, 1992 and assigned U.S. Ser. No. 07/967,988 and claiming the benefit of priority of a parent application entitled *Spacecraft Antennas & Beam Steering Methods for Satellite Communication System* by Douglas Gene Lockie, filed on Nov. 8, 1991 and assigned U.S. Ser. No. 07/790,271;

*Spacecraft Intersatellite Link for Satellite Communication System* by Douglas G. Lockie et al., filed on Jul. 16, 1992 and assigned U.S. Ser. No. 07/915,172;

*Method of Conducting a Telecommunications Business Implemented on a Computer* by Edward F. Tuck, filed on Jun. 8, 1992 and assigned U.S. Ser. No. 07/895,295;

*Traffic Routing for Satellite Communication System* by Moshe Lerner Liron, filed on Feb. 9, 1993 and assigned U.S. Ser. No. 08/016,204; and

*Modular Communication Satellite* by James R. Stuart, filed on Jun. 11, 1993 and assigned U.S. Ser. No. 08/075,425.

FIELD OF THE INVENTION

The present invention relates to the field of satellite designs. More particularly, this invention is part of a constellation of 840 extremely high power and ultra-lightweight spacecraft grouped in sets of 40 equally spaced satellites which circle the globe in 21 separate low Earth orbits. The satellites operate in 700 km (435 mile) circular, sun-synchronous orbits which are inclined approximately 98.2 degrees to the Equator.

BACKGROUND OF THE INVENTION

Communications satellites operating in Earth orbit were first seriously proposed during the middle of this century. A relatively small portion of current telephone traffic is relayed between ground stations by spacecraft carrying transponders that are located over a fixed position on the Earth in 22,300 mile geosynchronous orbits. Over the past few decades, public phone systems have relied primarily on land lines and microwave repeaters to handle call traffic. Cellular networks now provide service which extends previous network capabilities. Customers using hand-held portable phones or carphones are now able to access the conventional, centralized land-based system without using a traditional fixed phone, as long as their transportable terminals are within the range of land-based antenna towers called "cell sites." Even in the United States, these cell sites are not universally prevalent, since market forces restrict cellular service to only the most densely populated urban portions of our country. Since cellular service is available to only a small minority of privileged users in wealthy countries, and is virtually non-existent in lesser developed parts of the world, the operators of traditional phone networks are confronted with serious systemic problems that severely constrain the continued growth of their communications utilities.

No system that is currently available to the general public is capable of taking advantage of the enormous augmentation of communications capacity that could be achieved if the traditional centralized grid of terrestrial switches, wires, fibers, and microwave repeaters could be completely bypassed. Public phone companies are not presently able to sell continuous global service to their customers who wish to use phones that are not hard-wired to the land-based network. Some commercial spacecraft now in service help to relay some portion of the total call traffic, but all these calls must still pass through the conventional land-based system. The problem of providing an economically feasible network for voice, data, and video which can be used by subscribers all over the world has presented a major challenge to the communications business. The development of a constellation of reliable, high-gain satellites which can communicate directly to terrestrial terminals without routing calls through land-based networks would constitute a major technological advance and would satisfy a long felt need within the electronics and telephone industries.

SUMMARY OF THE INVENTION

The present invention is a vital part of a constellation of satellites which will revolutionize telecommunications by providing direct links among users across the world without using conventional land-based networks.

One of the preferred embodiments of the invention, called "Gearsat™", includes an inflatable torus. When viewed from the side along its circumference, the torus looks like two flattened pyramids that share a common base. Phased array antenna panels are deployed across the top of the pyramid, while arrays of amorphous silicon solar cells cover the slanted surfaces. The satellite rotates about its center, and individual portions of the antenna panels are specifically dedicated to transmit and receive signals from pre-defined regions on the ground.

A second embodiment, called "Batsat™", comprises a central cylindrical body and a plurality of collapsible hinged discs which carry antennas and solar/thermal arrays.

The present invention is a vital element of a novel *Satellite Communication System*, by Edward F. Tuck et al. which is described in a copending U.S. patent application Ser. No. 08/203,140. An appreciation of other aims and objectives of the present invention and a more complete and comprehensive understanding of this invention may be achieved by studying the following description of the preferred and alternative embodiments and by referring to the accompanying drawings.

A BRIEF DESCRIPTION OF THE DRAWINGS

FIGS. 1, 2, and 3 illustrate three views of the preferred embodiment of the invention called "Gearsat™."

FIG. 4 provides a perspective illustration of an uninflated Gearsat™ as it is prepared for placement into a launch vehicle.

Figure 8:
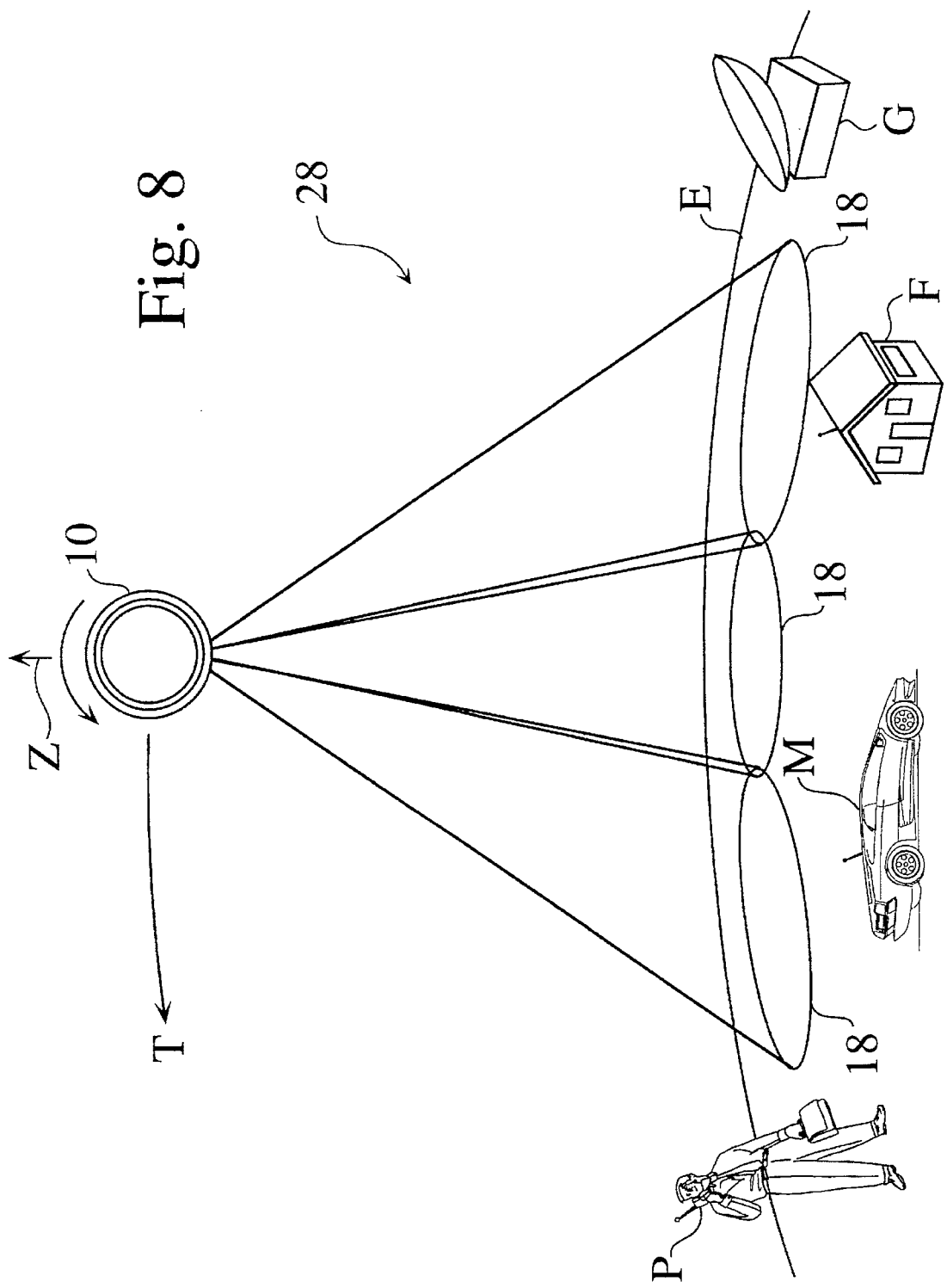

FIG. 8 provides a schematic depiction of adjoining phased-array antennas located along the periphery of the Gearsat™ satellite providing communications service to adjoining footprints along the surface of the Earth.

Figure 9:
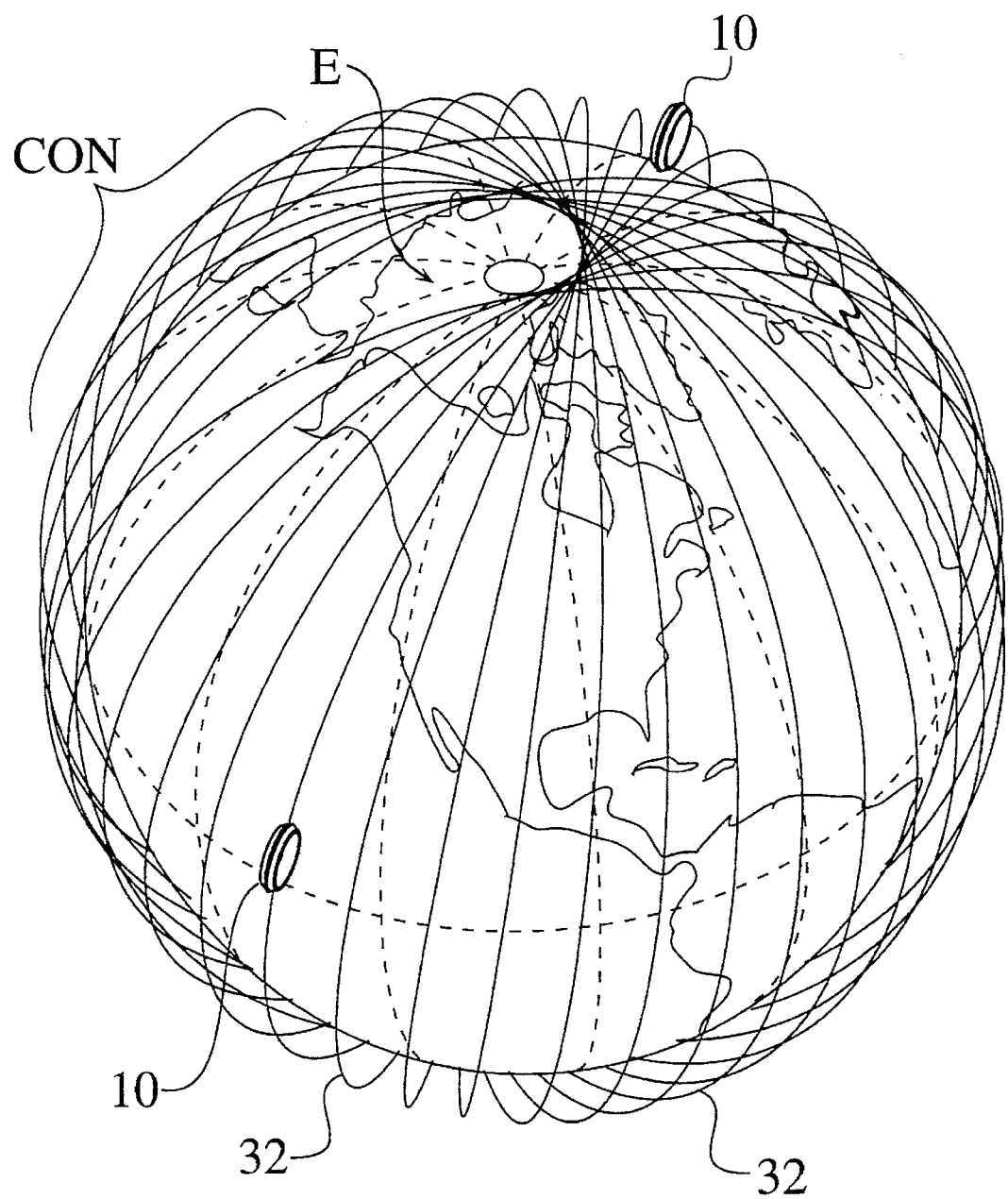
Figure 10:
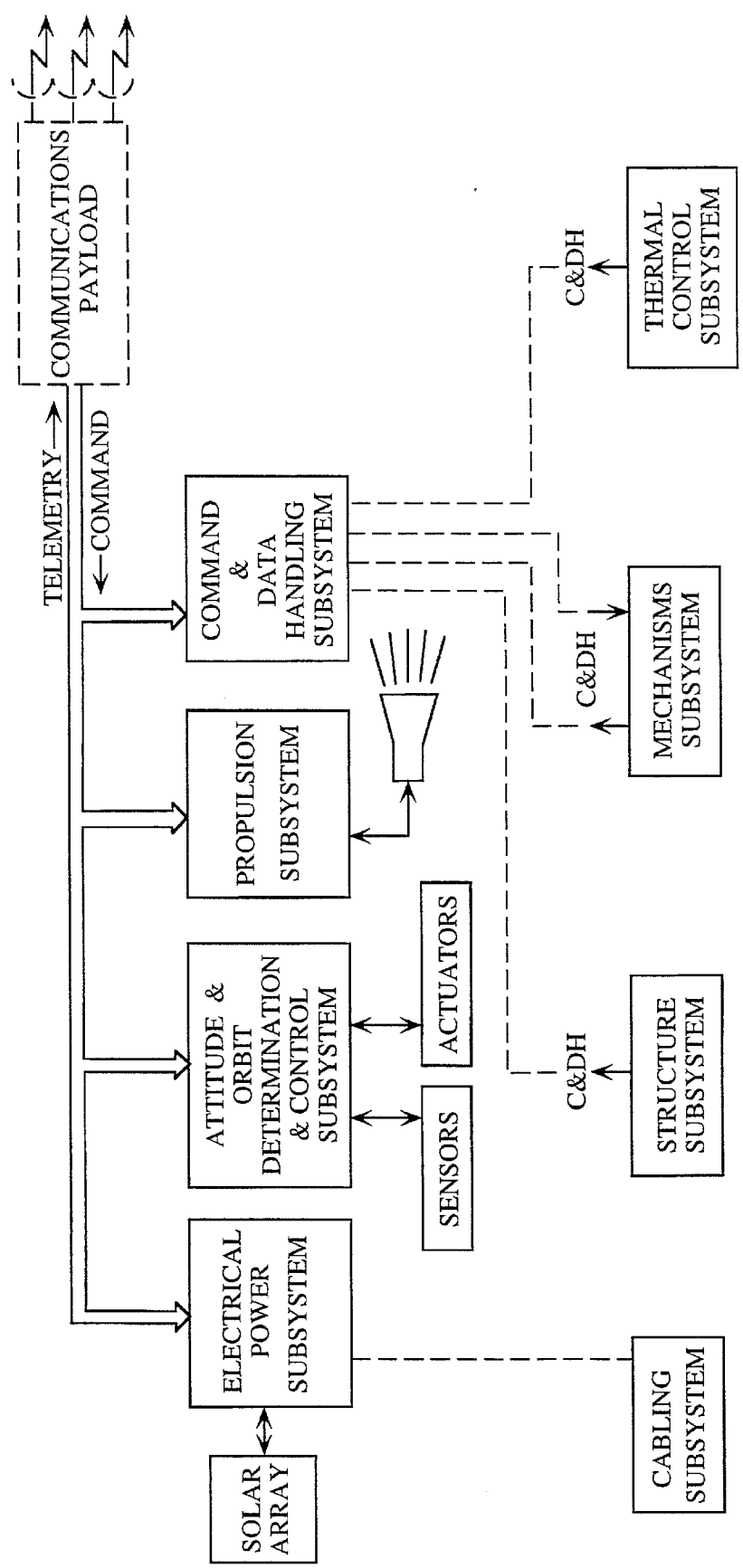
Figure 11:
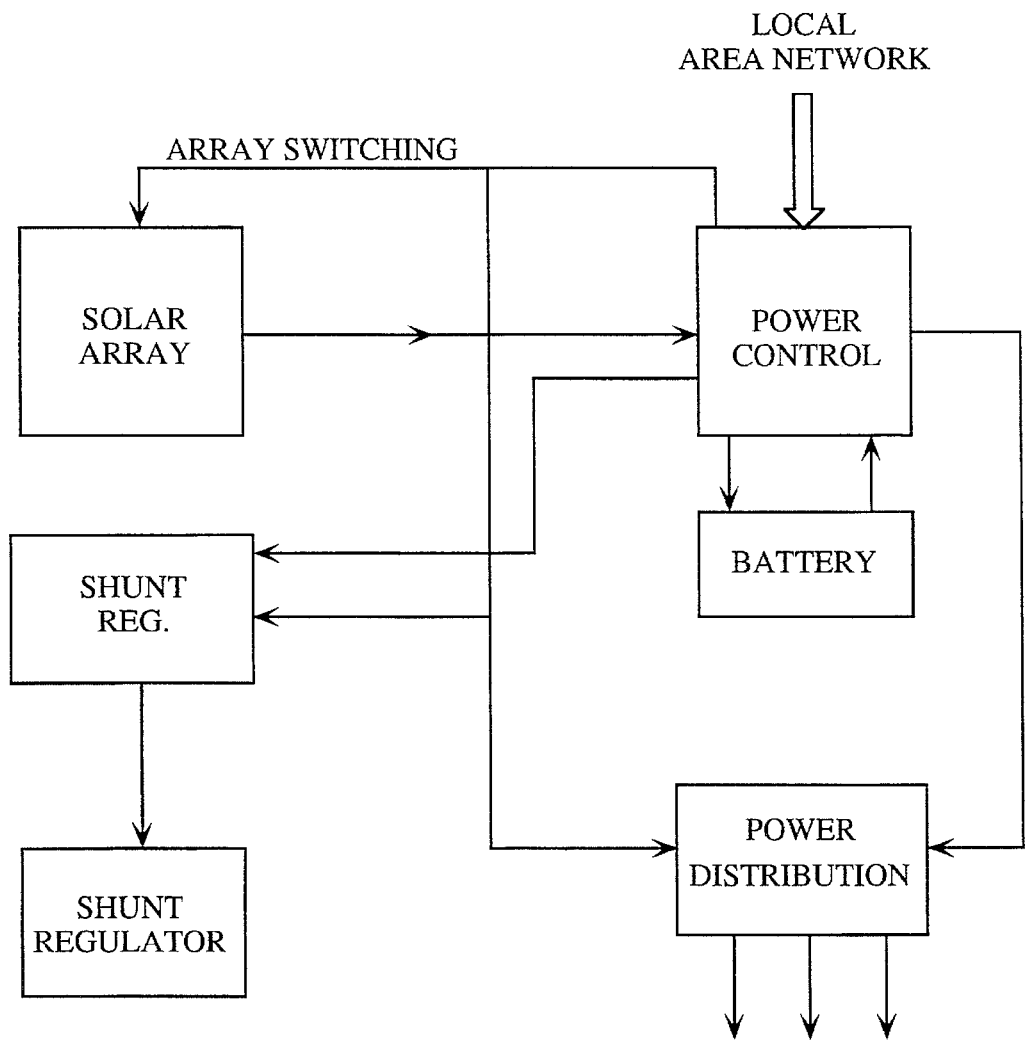
Figure 12:
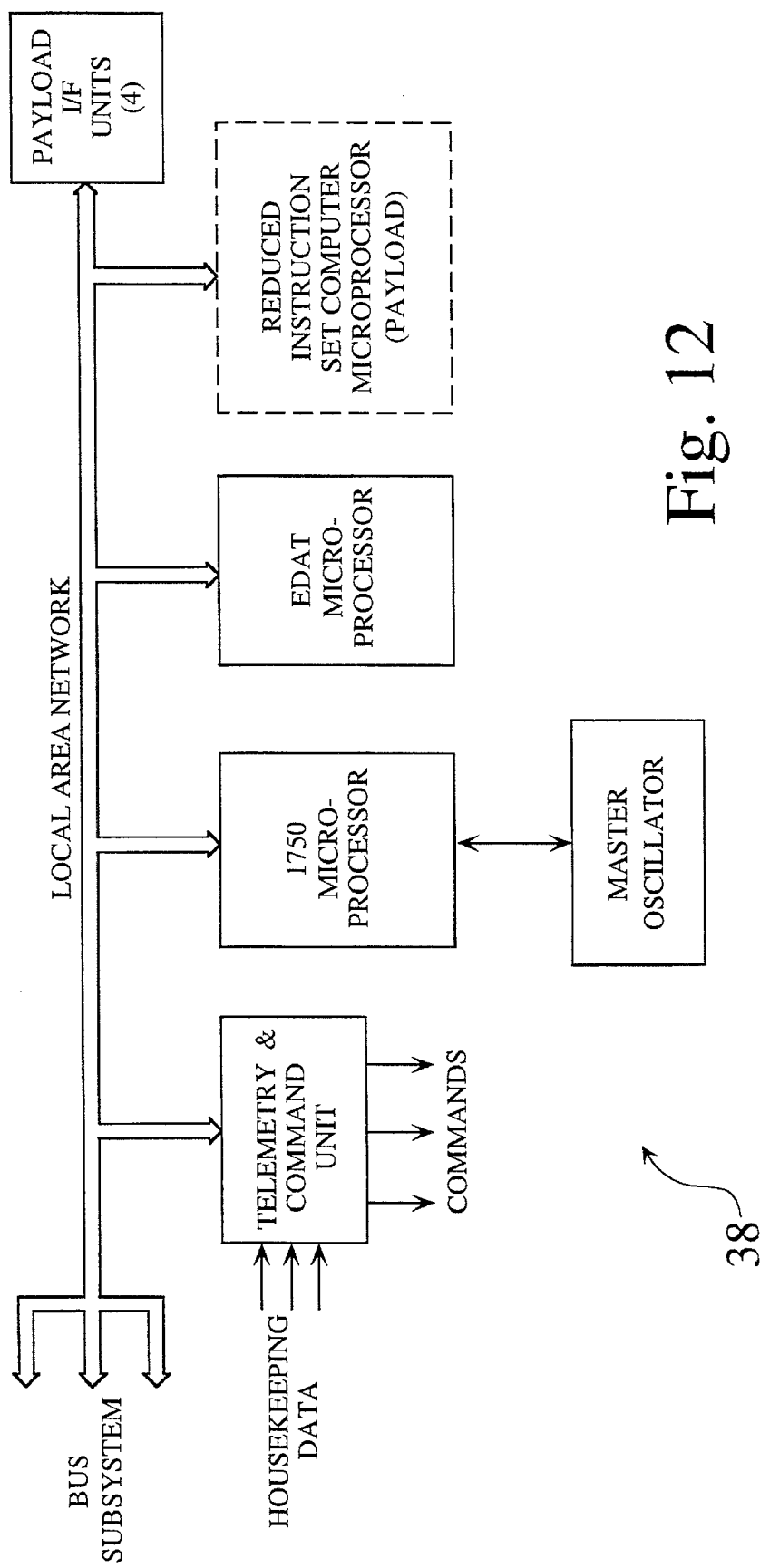
Figure 13:
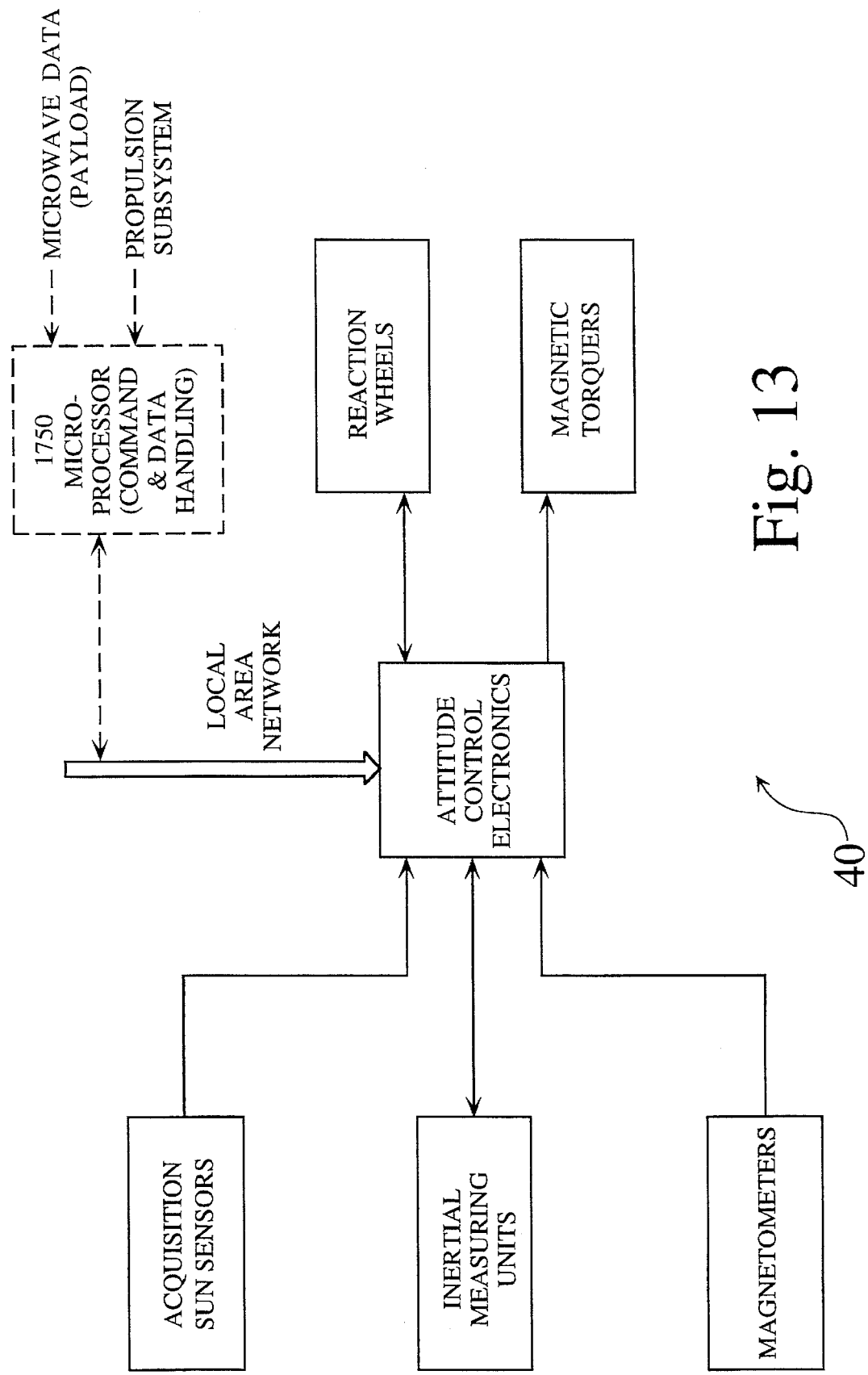

FIG. 9 portrays a constellation of Gearsat™ satellites in orbit above the Earth.

FIGS. 10, 11, 12, and 13 are schematic diagrams of on-board internal systems that control the satellite and that handle traffic among other satellites and terminals on the ground.

Figure 15:
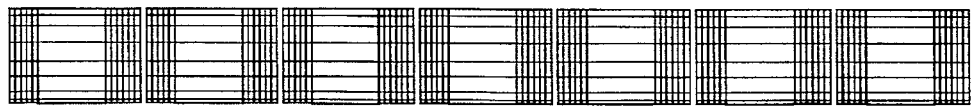
Figure 14:
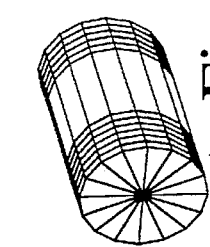

FIGS. 14, 15, 16, 17, 18 and 19 depict an another embodiment of the invention which is generally referred to as "Batsat™". FIG. 14 shows a perspective view of the satellite, and FIG. 15 shows multiple Batsat™ satellites in their stowed configuration within a launch vehicle.

Figure 16:
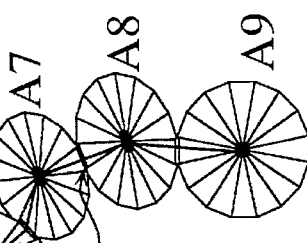

FIG. 16 provides a top view of a Batsat™ satellite as it is released from the launch vehicle into orbit above the Earth.

Figure 17:
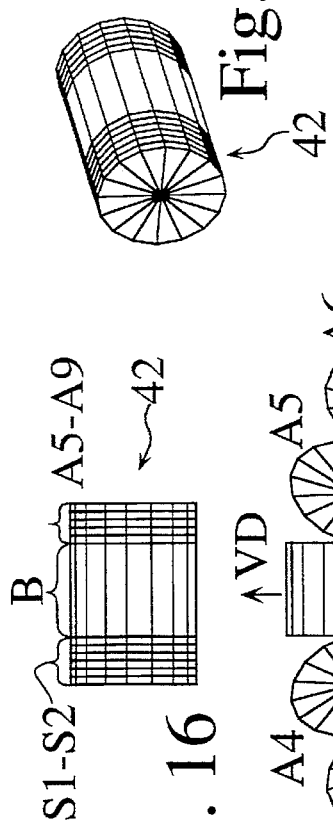
Figure 18:
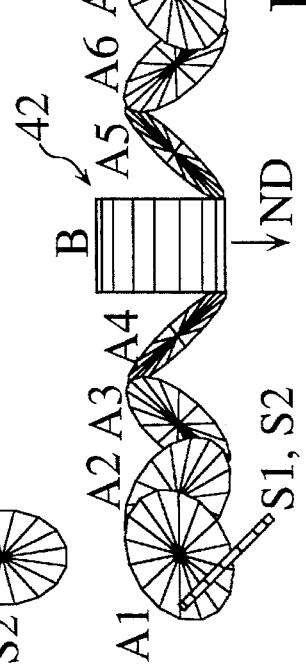
Figure 19:
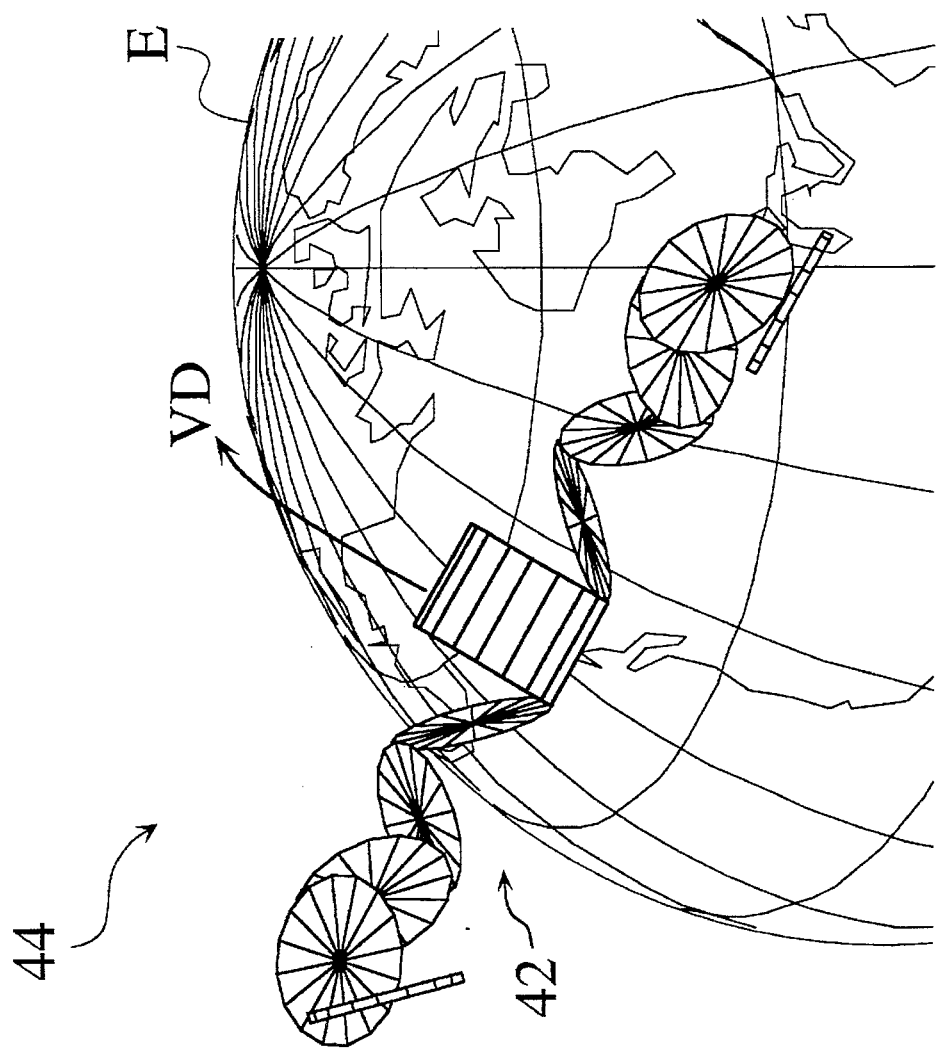

FIGS. 17, 18 and 19 supply top, rear, and perspective views of an orbiting Batsat™ satellite in its expanded position after deployment above the Earth.

Figure 21:
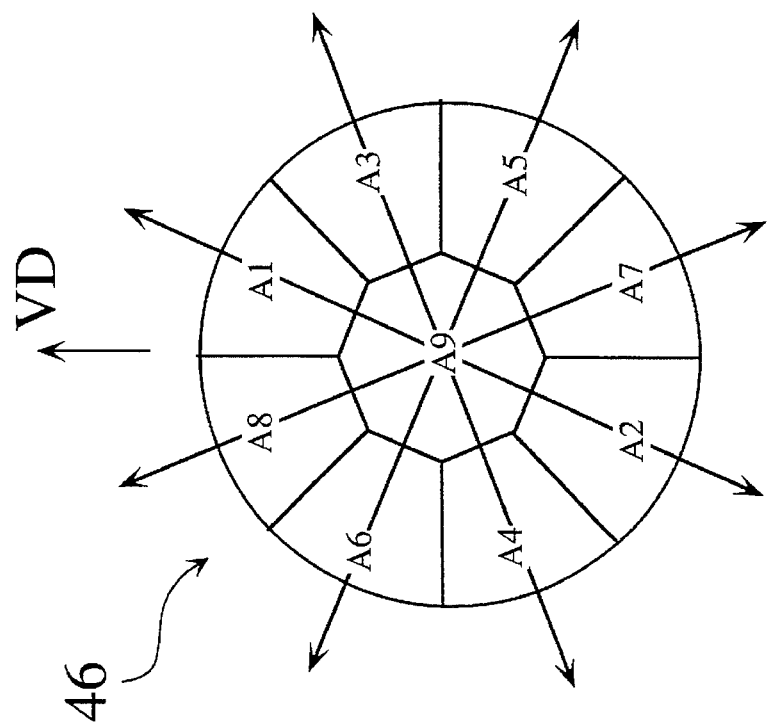
Figure 20:
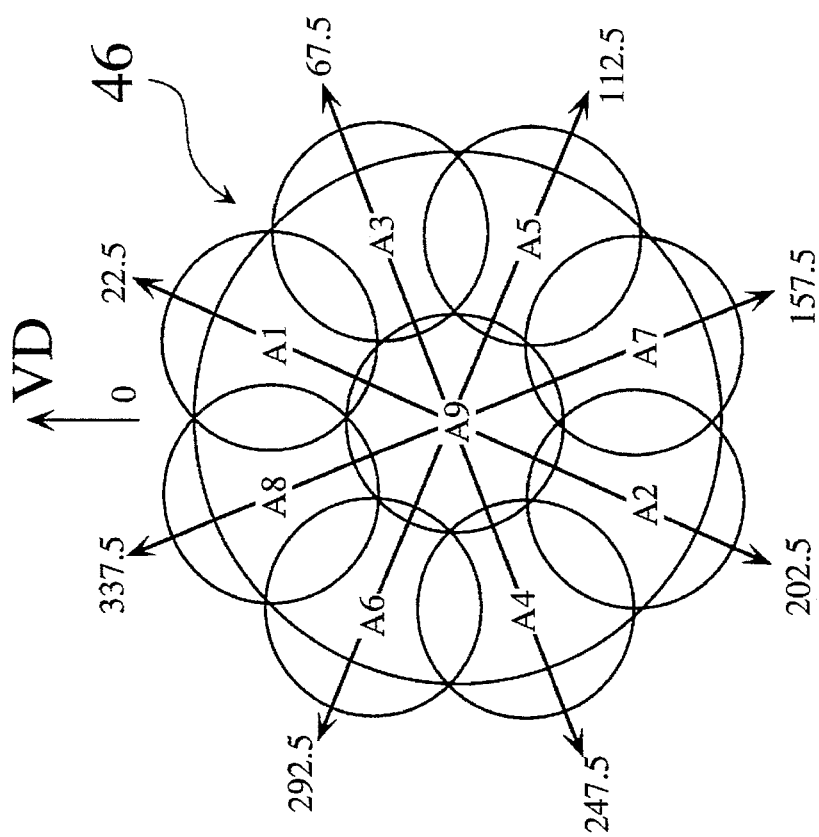

FIGS. 20 and 21 illustrate the satellite footprints generated by Batsat™.

FIG. 22 is an enlarged view of the illustration of Batsat™ supplied by FIG. 18.

FIGS. 23 and 24 are schematic depictions of the hexagonal antennas, solar cells and thermal radiators borne by the circular panels shown in FIGS. 17 and 18.

Figure 25:
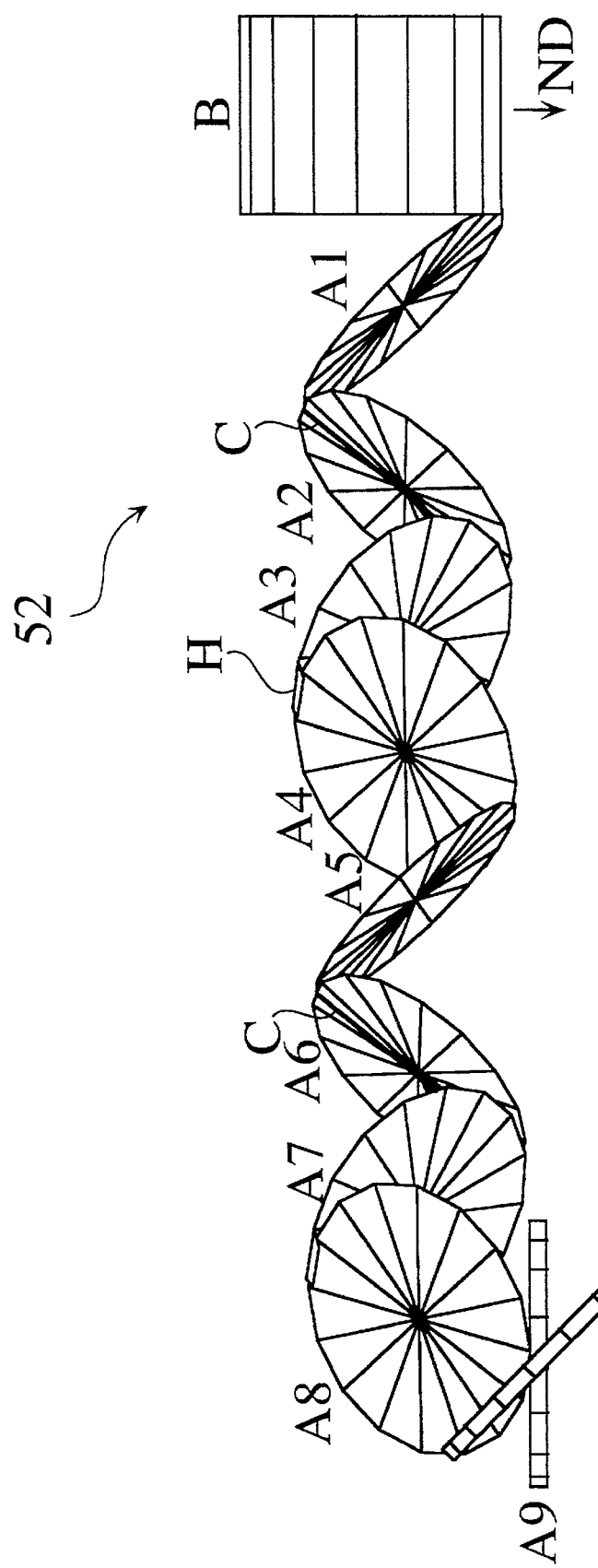

FIG. 25 is an alternate design for the Batsat™ embodiment of the present invention, which features extension of circular panels from a single side of the central satellite body.

A DETAILED DESCRIPTION OF PREFERRED AND ALTERNATIVE EMBODIMENTS

Gearsat

FIGS. 1, 2, and 3 illustrate three views of the preferred embodiment of the invention called "Gearsat™". One embodiment of Gearsat™ 10 is shown schematically in a side view in FIG. 1, and comprises an inflatable torus having a radius of approximately ten (10) meters. The scale of the Gearsat™ torus 10 is suggested in a side view by FIG. 2, which includes a schematic representation of a person PN standing two meters tall.

Once deployed in orbit, Gearsat™ 10 revolves about its center at a rate of roughly 0.1 revolutions per minute, turning slowly like a rolling pin whose longest dimension extends perpendicular to its direction of travel T. The axis of rotation of the Gearsat™ satellite 10 is always normal to its orbital pathway. An outermost surface 12 that generally defines a cylinder lies at the periphery of the satellite 10. This cylindrical surface 12 bears an array of antennas 14 which transmit and receive radio signals to and from other satellites in the constellation and to and from portable P, mobile M and fixed F terminals, gateways G and other satellites. The antenna array 14 includes sixty (60) adjacent rectangular panels, each measuring approximately one meter square. As best seen in the partial side view 3 presented in FIG. 3, two rows of solar cells 16 lie adjacent to the antennas 14. The sixty antenna panels 14 comprise an active, electronically steered phase array. The reader is invited to peruse the construction specifications of these antennas by referring to a copending U.S. patent application Ser. No. 07/915,172 entitled *Spacecraft Antennas & Beam Steering Methods for Satellite Communication System* by Douglas Gene Lockie et al.

At any given time, three of the sixty antenna panels 14 are pointed toward the Earth's surface and are transmitting and receiving signals. As the satellite 10 revolves, antenna panels 14 become active as they move into position facing the Earth E, and also terminate their activity as they turn away from the Earth. This continuous hand-off of the communication operation from one set of antenna panels 14 to another is controlled by Earth sensors, and insures that radio beams from the satellite 10 are always illuminating the surface of the Earth below them. The area of the ground in the path of these beams is called the "footprint" 18 of the satellite 10, as described below. The Gearsat™ embodiment derives its name from the spatial synchronization of the antenna panels 14 with specific regions of the ground that are illuminated by the beams generated by the antennas 14. Like the engaged teeth of two mechanical gears, particular antenna panels 14 in the array are matched with particular regions on the ground. Radio beams emanating from the sixty panels 14 are essentially "locked" or dedicated to specific footprints 18 or cells below it on the Earth's surface. While the text above specifies one particular satellite configuration that offers this form of spatial synchronization among antennas 14 and beam footprints 18, the reader will appreciate that the central objective of providing a dedicated relationship among many antennas and footprints may be carried out using a wide variety of various implementations without departing from the spirit and scope of the invention claimed below.

Figure 4:
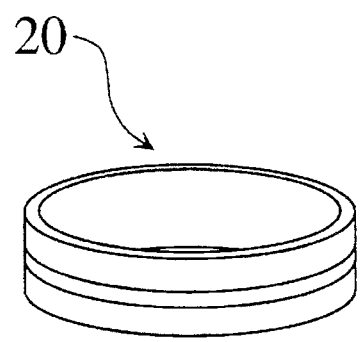

FIG. 4 provides a perspective illustration of an uninflated Gearsat™ 10 as it is prepared for placement into a launch vehicle L.

Figure 5:
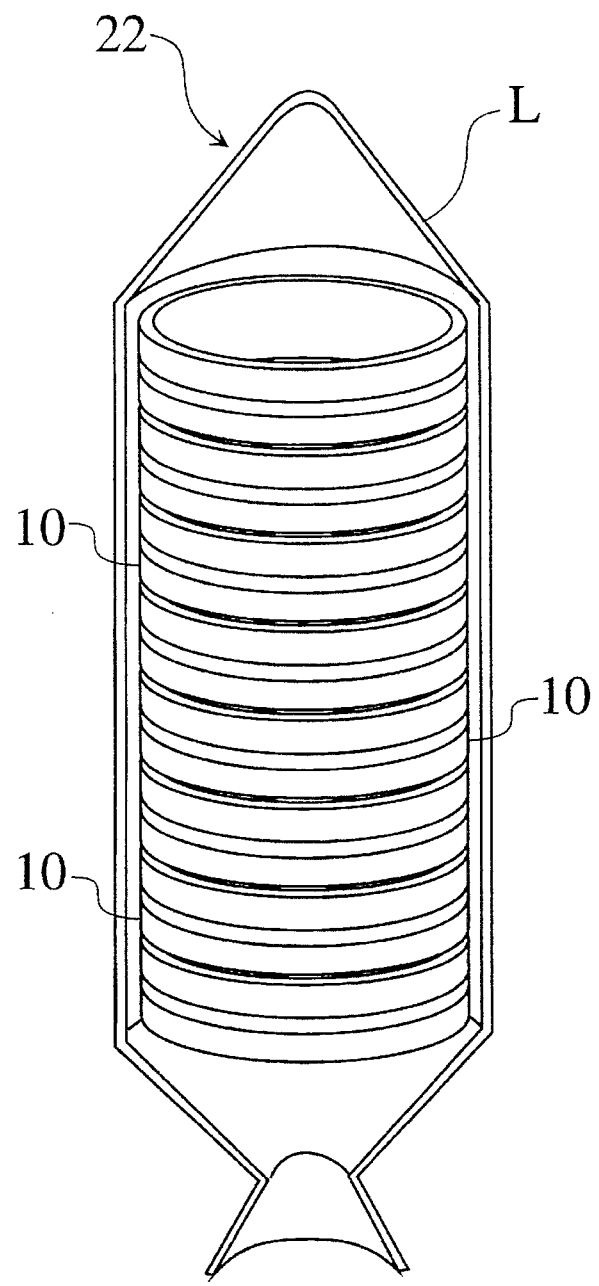
FIG. 5 is a perspective cutaway view of multiple Gearsat™ satellites stored in the confines of a launch vehicle.

FIG. 5 is a perspective cutaway view which portrays several Gearsat™ satellites 10 stored coaxially in a compact arrangement within the payload bay of a launch vehicle L. Before the satellite 10 is released and inflated, the spacecraft resembles a hollow cylinder. In the preferred embodiment, the Gearsat™ satellites 10 are stacked inside launch vehicles in their uninflated position to conserve volume and minimize the expense of placing the satellites 10 into orbit.

Figure 6:
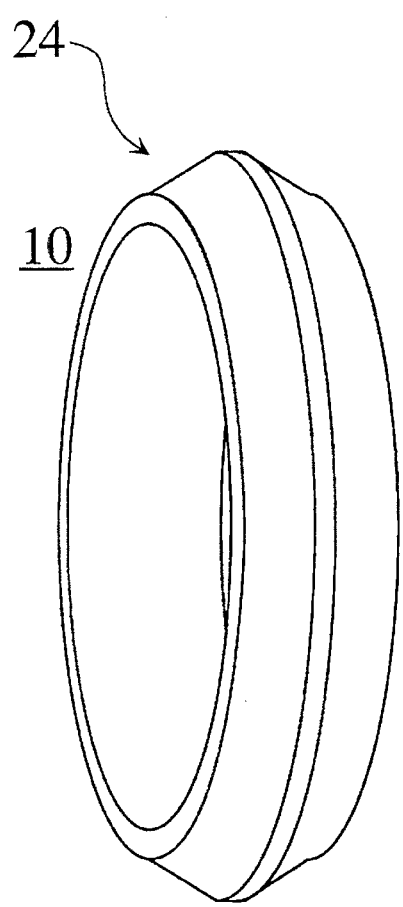
FIG. 6 is a perspective depiction of a Gearsat™ satellite as it is released into orbit and is inflated.

FIG. 6 is a perspective depiction of a Gearsat™ satellite 10 as it is released into orbit and is inflated.

Figure 7:
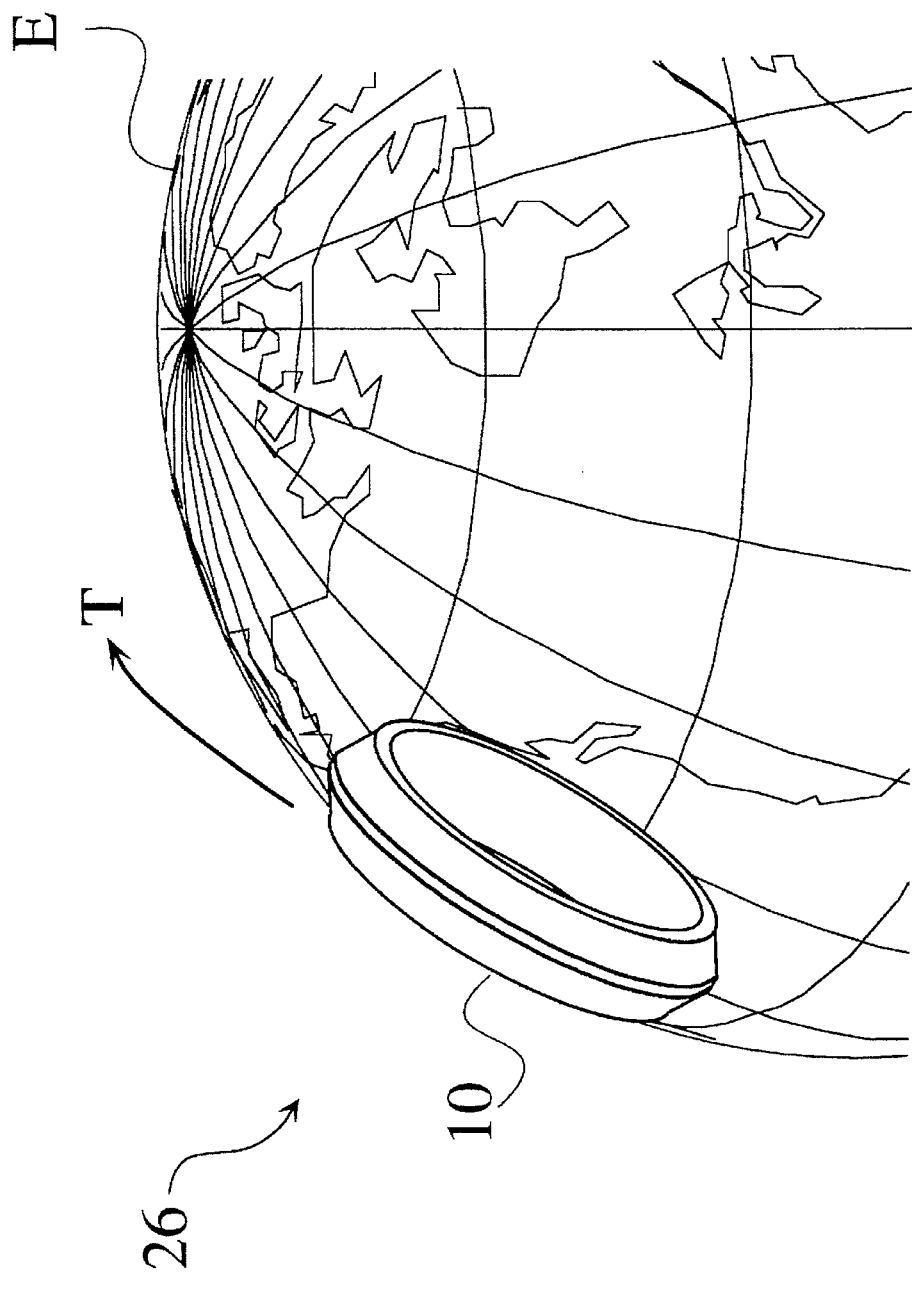
FIG. 7 shows an inflated Gearsat™ satellite in orbit above the Earth.

FIG. 7 is an illustration 26, which shows an inflated Gearsat™ satellite in orbit above the Earth, travelling in direction T.

FIG. 8 provides a schematic depiction 28 of adjoining phased-array antennas 14 located along the periphery of the Gearsat™ satellite 10 providing communications service to adjoining footprints 18 along the surface of the Earth E.

In one of the preferred embodiments of the invention, the satellites shown in the figures operate in a constellation (CON) of 840 spacecraft which includes 21 sets of 40 equally-spaced satellites flying in 21 orbits 32, as depicted in the perspective view 30 in FIG. 9. The entire fleet travels around the Earth E in sun-synchronous orbits 700 km (435 miles) above the Earth. The circular orbits are inclined 98.2 degrees to the Equator. There are 21 orbit planes at different fixed longitude-of-ascending-nodes. Each plane is separated approximately 8.6 degrees (8 degrees and 34.3 minutes) from its neighbors. Every plane is occupied by 40 equally spaced satellites. All ascending nodes are grouped together between 6 AM and 6 PM. Satellites in adjacent orbits 32 travel in the same direction except at the "seams" between north-going and south-going portions of the orbits. The satellite system is three-axis stabilized and momentum biased. Magnetic torquers, reaction wheels and passive aerodynamic pressure provide the required autonomous control torques that keep the antenna panels 14 pointed toward the Earth E, and the satellite 10 pointed toward the direction of travel T as shown in FIG. 8.

FIGS. 10, 11, 12 and 13 are schematic diagrams of on-board internal systems that control the satellite and that handle traffic among other satellites and terminals on the ground. The systems illustrated in FIGS. 10, 11, 12 and 13, which include the control system 34, the power system 36, the information system 38, and the positioning system 40, may be generally incorporated in any of the satellite embodiments of the present invention.

The subsystems of each spacecraft 10, 42, 52 are identified below:

An Electrical Power Subsystem (EPS) derives energy from the photovoltaic cells covering panels 16, and power is stored in nickel metal-hydride batteries.

An Attitude and Orbit Determination and Control Subsystem (AODC) maintains the orientation of the spacecraft using three axis stabilization methods. Sun sensors are used as an initial reference once the satellite achieves orbit. Afterwards, inertial measuring units, magnetometers, and information gathered from call traffic is used to keep the craft on course and steady in its desired position. Each satellite "knows" its own position and the positions of all the other satellites in the constellation, as well as all the positions of terminals on the ground.

A Propulsion Subsystem uses redundant pulse-plasma thrusters which accomplish maneuvers that include orbit insertion, drag make-up, stationkeeping and deorbit at the end of the satellites lifetime.

A Command and Data Handling Subsystem (C&DH) acquires, conditions and formats all satellite data and decodes, stores and distributes all satellite commands. The C&DH comprises a processor with a 4 Gb solid-state RAM memory that is coupled to a local area network (LAN). A microprocessor analyzes, interprets and compresses on-board data, and another microprocessor, running at 20 million instructions per second (MIPS), is dedicated to processing traffic.

A Structure Subsystem comprises the support skeleton and inflatable torus which bears the antenna array 14.

A Mechanisms Subsystem includes components that deploy the inflatable torus and orient the solar panels 16.

A Thermal Control Subsystem includes blankets and coats of paint that manage the thermal conditions of the satellite.

A Cabling Subsystem contains all the conductors that unite the power and signal electronics on the ship.

The Subsystems described above and illustrated in FIGS. 10, 11, 12 and 13 may be employed with any of the satellite embodiments described in this specification.

Batsat™

FIGS. 14, 15, 16, 17 and 18 depict an alternative embodiment of the invention which is generally referred to as "Batsat™" 42 due to its resemblance to a bat with its wings spread for flight. FIG. 14 shows the satellite in its folded and stowed configuration, while FIG. 15 portrays several folded units stacked together in preparation for launch. FIG. 16 shows the Batsat™ satellite 42 in its folded position as it exits the spacecraft. FIGS. 17 and 18 supply schematic top and rear views of the Batsat™ embodiment 42 after it has reached orbit and has been completely unfolded and locked into its operational configuration, with velocity direction VD and orientation towards Nadir ND, as shown. FIG. 19 is an illustration 44 which shows the Batsat™ satellite in orbit over the Earth E. FIGS. 20 and 21 illustrate the Batsat™ satellite footprints 46 generated by radio beams emitted by Batsat™ 42. FIG. 20 illustrates the potential footprint coverage capability for each panel, while FIG. 21 illustrates the primary coverage areas without overlap.

FIG. 22 is an enlarged view which supplies details of the satellite 42 shown in FIG. 18. FIGS. 23 and 24 are top views 48 and 50 that reveal the antenna surfaces X and solar/thermal surfaces Y which reside on antenna panels A1 through A9 and solar/thermal panels S1 and S2, respectively.

The preferred embodiment of Batsat™ 42 includes a central cylindrical body B and two arms that extend away from the central body B in generally opposite directions. The arms comprise nine substantially circular, disc-shaped antenna panels A1 through A9, and a pair of solar/thermal panels S1 and S2. The central body B has a generally cylindrical shape, and includes two flat faces which receive antenna panels A4 and A5 when the satellite 42 is in its folded and stowed configuration. When deployed after reaching orbit, the two flat faces of the body B are positioned perpendicular to the direction of the Nadir ND. As best seen in FIG. 22, four antenna panels A1, A2, A3 and A4 are connected in series to and extend from one side of central body B, while the other five antenna panels A5, A6, A7, A8 and A9 are similarly connected in series and extend in the opposite direction. The two solar/thermal panels S1 and S2 are connected in series to antenna panel A1. Each antenna or solar/thermal panel is coupled to its neighbor or neighbors with power, control and communication cables C and spring-loaded self-latching hinges H. Each panel has two generally circular flat faces. The face of each antenna panel A1–A9 which is oriented toward the Earth's surface carries a set of hexagonal antenna surfaces X. The faces of the two solar/thermal panels S1 and S2 carry both hexagonal areas of solar cells and thermal radiators Y. When Batsat™ is fully deployed, all the connected antenna panels A1–A9 and solar/thermal panels S1 and S2 are spaced as far apart as the hinges H and cables C allow. In this configuration, the spacecraft resembles a bat with its wings fully extended in two opposing arcs, and the elements of the satellite 42 reside at their "maximum possible unfolded distances" from central body B. When the Batsat™ panels are folded together like an accordion, the elements of the ship reside at their "minimum possible folded distances" from central body B.

An alternate embodiment of the present invention is similar in construction, features and function to Batsat™ 42, but with antenna panels A1–A9 and solar panels S1 and S2 extending from only one side of the body B. This single sided satellite is a single armed Batsat™ 52, and can be seen in FIG. 25.

Batsat™ incorporates high-gain, electronically-steered, phased-array antennas X to provide telecommunication links over a contiguous surface area within view of the satellite 42. The problem faced by nearly all satellite systems concerns the limited amount of frequency spectrum available for communication links between a satellite communication system and communication terminals on the Earth. Previous systems employ various multiple access schemes which divide the footprint generated by the satellite's illumination into multiple spots or cells. These cells are organized into patterns which allow the same frequencies to be reused many times within a particular footprint. When the frequencies are physically separated, the reuse technique is called "space division", and is represented by the acronym "SDMA", or space division multiple access. When the codes are different, the method is called "code division" and the abbreviation "CDMA" is used as a shorthand expression for "code division multiple access". The acronym "TDMA" stands for "time division multiple access", and indicates that many beams having the same frequency are emitted at different times. Each of these techniques help to eliminate interference between cells using the same frequencies. As a general rule, the smaller the cell, the more the set of frequencies can be reused within the footprint. The reuse of frequencies leads to spectral efficiency and the potential for higher capacity for the satellite 42, 52 and network as a whole.

To achieve full footprint coverage, the number of cells in a satellite footprint 46 is selected to be inversely proportional to the area of the cell. Assuming each satellite antenna A1–A9 produces one transmit or receive beam which is multiplexed over a fixed number of cells, the number of antennas on the satellite then also increases as the cell size decreases. The cell size is primarily a function of the directivity, or antenna gain, of the satellite antenna—the smaller the cell size, the higher the required gain.

For a given frequency, the gain of an antenna is proportional to its effective area of the antenna in the direction of the source (destination) of the received (transmitted) signal. The effective area of a flat surface phased array antenna is greatest along the Zenith, which is colinear with the line perpendicular to the surface of the antenna. The effective area, and thus the gain, decreases in proportion to the cosine of the angle between the zenith and a line to the communication source/destination. For the best antenna performance, the required beam steering angle needs to be kept small so that the antenna's effective area is close to its actual area. For this reason, Batsat™ 42, 52 is designed to achieve high spectral efficiency and system capacity. The present invention includes a large number of high-gain antennas and a corresponding large amount of antenna surface area. The antenna surfaces are arranged to keep the beam steering requirements to a few degrees.

Batsat™ 42,52 not only offers high spectral efficiency and system capacity, but does so at a minimal launch cost. Because the present invention can be folded, stacked and packed into a relatively small launch vehicle (L), the cost of placing each satellite into orbit is relatively low.

Each antenna panel A1–A9 is responsible for one portion of the satellite footprint. In its fully deployed configuration, the antenna panels A1–A9 are arranged at angles with respect to the Earth E which limit the beam steering angle of each antenna beam to a few degrees, yet allow full coverage of the footprint area by the plurality of antennas. Two panels S1 and S2 at the end of each arm provide solar arrays on the side facing the sun and thermal radiators on the opposite side. These panels are deployed at an angle which is the optimal angle for both solar energy collection and thermal radiating for the sun-synchronous orbit in which the satellite operates. The hinges H are spring loaded latching hinges. Once released from their restraints, the panels A1–A9, S1 and S2 deploy automatically. The springs push the panels apart, and the locking mechanism locks them into the correct deployment angle. The hinges on each panel which join that panel to the previous panel or satellite body B and to the next panel are offset from each other. The combination of offset angle and the hinge locking angle determines the deployment angle of each panel. For example, if the offset angle is 180 degrees and the locking angle is 90 degrees, the deployed wings would extend straight along the axis of the central body in a series of perpendicular panels. By changing the offset angle of the hinges, the panels can be deployed in an arc extending from each end of the central body such that each panel points at a different angle (azimuth and elevation) with respect to the earth. The flexible cables C may include optical fibers or copper wires, and connect the panels with each other and to the central body for passing control, data, power, etc.

Since the preferred embodiment of the invention is deployed in a sun-synchronous orbit, there is an optimum deployment angle for solar arrays and thermal radiators. For example, in the terminator orbit (6 a.m.–6 p.m.), a vertically oriented array will always have one face to the sun and one to cold space. A panel with solar collection on one side and thermal radiators on the other can be deployed at one angle which is the optimal angle for both functions for the life of the satellite. In this design, the solar/thermal panels are the last panel(s) on the arms and are designed to be rotated about an axis parallel to the velocity vector of the satellite and latched to the correct angle. The solar array is stowed as a panel of the same diameter as the other panels for packing efficiency, but may include deployment mechanisms if the surface area required exceeds that of one or two panels.

Although the preferred embodiment of Batsat™ 42 has been described as comprising the central body B, nine antenna panels A1–A9 and two solar/thermal panels S1 and S2, additional small panels may used for intersatellite links. The antenna panels comprise multiple antenna facets, each capable of generating a single transmit or receive beam. Each beam can be steered ±15° from its zenith in all directions. Table One supplies the antenna deployment angles with respect to the satellite nadir. One panel points in the nadir direction, while the other eight antenna panels point in directions which are displaced 30° in elevation from the nadir and evenly spaced at 45° increments in azimuth.

TABLE ONE

| Reference | Element | Elevation | Azimuth |
|---|---|---|---|
| B | Satellite Body | NA | NA |
| A1 | Antenna Panel 1 | 45 | 22.5 |
| A2 | Antenna Panel 2 | 45 | 202.5 |
| A3 | Antenna Panel 3 | 45 | 67.5 |
| A4 | Antenna Panel 4 | 45 | 247.5 |
| A5 | Antenna Panel 5 | 45 | 112.5 |
| A6 | Antenna Panel 6 | 45 | 292.5 |
| A7 | Antenna Panel 7 | 45 | 157.5 |
| A8 | Antenna Panel 8 | 45 | 337.5 |
| A9 | Antenna Panel 9 (Nadir) | 0 | NA |
| S1 | Solar/Thermal Panel 1 | 45 | 90 |
| S2 | Solar/Thermal Panel 2 | 45 | 90 |
| C | Power, Control, and Communication Cables | NA | NA |
| H | Spring Loaded,Self-Latching Hinges | NA | NA |

The values presented below the column labeled "Elevation" are angles measured in degrees with respect to the direction of the Nadir. The values presented below the column labeled "Azimuth" are angles measured in degrees with respect to the direction of the Velocity Vector, as shown in FIG. 19.

Each of the embodiments of the invention, Gearsat™ and Batsat™ may incorporate fluoropolymer thrusters, which may use Teflon®, a well known fluoropolymer family produced by Dupont for precise altitude, attitude and position control. These thrusters use small pieces of a material such as Teflon® as fuel. Extremely small amounts of the Teflon® are expelled from miniature nozzles, and the slight reactions of the spacecraft provide highly precise position control.

More detailed information about the constellation may be found in a related, copending application entitled *Satellite Communication System* by Edward F. Tuck et al. The design and operation of the antennas are more fully disclosed in a related, copending application entitled *Spacecraft Antennas & Beam Steering Methods for Satellite Communication System* by Douglas G. Lockie, which is also noted above.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various orbital and antenna parameters and satellite population and configuration statistics that have been disclosed above are intended to educate the reader about one preferred embodiment, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

LIST OF REFERENCE CHARACTERS

FIGS. 1, 2 and 3
10 Gearsat™
12 Cylindrical surface
14 Rectangular antenna panels on cylindrical surface
16 Solar panels
P Schematic representation of a person two meters tall
FIGS. 4, 5, 6, 7, 8 and 9
10 Gearsat™
18 Gearsat™ footprints
20 Perspective view of deflated Gearsat™
22 Multiple Gearsat satellites within launch vehicle
24 Perspective view of inflated Gearsat™
26 View of orbiting Gearsat™ above the Earth
28 View of orbiting Gearsat™ with footprints over ground
30 Satellite constellation
32 Orbital plane
CON Constellation of satellites
E Earth
F Fixed terminal
G Gateway
L Launch Vehicle
M Mobile terminal
P Portable terminal
T Direction of travel of orbiting satellite
Z Direction of Zenith
FIGS. 10, 11, 12 and 13
34 Schematic diagram of internal satellite control system
36 Schematic diagram of internal satellite power system
38 Schematic diagram of internal satellite information system
40 Schematic diagram of internal satellite positioning system
FIGS. 14, 15, 16, 17, 18, 19, 20, 21, 22, 23, 24 and 25
42 Batsat™
44 View of Batsat™ satellite in orbit over Earth
46 Batsat™ footprints
48 View of antenna panels
50 View of solar/thermal panels
52 One Armed Batsat™
A1 Antenna Panel 1
A2 Antenna Panel 2
A3 Antenna Panel 3
A4 Antenna Panel 4
A5 Antenna Panel 5
A6 Antenna Panel 6
A7 Antenna Panel 7
A8 Antenna Panel 8
A9 Antenna Panel 9 (Nadir)
B Central Body
C Power, Control and Communication Cables
E Earth
H Spring Loaded, Self-Latching Hinges
ND Nadir direction
S1 Solar/Thermal Panel 1
S2 Solar/Thermal Panel 2
T Direction of travel
VD Velocity direction
X Antenna surfaces
Y Solar/thermal surfaces

What is claimed is:

1. A spacecraft apparatus capable of being placed in a low Earth orbit (32) using a launch vehicle (L), said spacecraft having a velocity direction (VD) and a direction to the Nadir (ND) while in orbit comprising:

a central body (B);

a plurality of antenna panels (A1–A9);

a plurality of solar/thermal panels (S1–S2);

said antenna panels (A1–A9) and said solar/thermal panels (S1–S2) stowed before launch in said launch vehicle (L) in stacked layered relationship against said central body (B);

a plurality of hinges (H) for movably coupling said antenna panels (A1–A9) and said solar/thermal panels (S1–S2), serially, each to another and to said central body (B) at an attachment point on an edge of each of said panels (A1–A9, S1–S2); each said attachment point being rotatable, in respect of a preceding attachment point, to a hinge locking angle in an elevation direction and displaced from said preceding attachment point by an offset angle in an azimuth direction;

said antenna panels (A1–A9) and said solar/thermal panels (S1–S2) being deployed in orbit, taking the shape of an arm, and being uniquely positioned in said arm with respect to said direction to the Nadir (ND), by said hinge locking angle and said offset angle in combination, to cover a desired footprint area on the Earth's surface and to achieve an optimal angle for solar energy collection and thermal radiation.

2. A spacecraft apparatus capable of being placed in a low Earth orbit (32) using a launch vehicle (L), and also capable of operating as one of a constellation (CON) of communications satellites in a low Earth orbit (32) for providing communications among said constellation of communications satellites and among a plurality of portable (P), mobile (M), and fixed (F) terminals and gateways (G) and other satellites in said constellation (CON) comprising:

a central body (B) for providing rigid support;

a plurality of antenna panels (A1–A9) for communicating with said plurality of portable (P), mobile (M), and fixed (F) terminals and gateways (G); said plurality of antenna panels (A1–A9) including a plurality of antenna surfaces (X);

a plurality of solar/thermal panels (S1 and S2) for supplying electrical power and radiating heat; said plurality of solar/thermal panels (S1 and S2) including a plurality of solar/thermal surfaces (Y);

a plurality of flexible cables (C) for coupling said central body (B) to said plurality of antenna panels (A1–A9), for coupling together said plurality of antenna panels (A1–A9) and for coupling said plurality of antenna panels (A1–A9) to said plurality of solar/thermal panels (S1 and S2);

a plurality of hinges (H) for coupling said central body (B) to said plurality of antenna panels (A1–A9), for coupling together said plurality of antenna panels (A1–A9) and for coupling said plurality of antenna panels (A1–A9) to said plurality of solar/thermal panels (S1 and S2);

said plurality of antenna panels (A1–A9) and said plurality of solar/thermal panels (S1 and S2) all being capable of being folded and stowed in a compact stacked relationship against said central body (B) so that said plurality of antenna panels (A1–A9) and said plurality of solar/thermal panels (S1 and S2) are positioned at their minimum possible folded distances from said central body (B); and said plurality of antenna panels (A1–A9) and said plurality of solar/thermal panels (S1 and S2) all being capable of being unfolded in a fully extended, locked and deployed operational configuration in which said plurality of antenna panels (A1–A9) and said plurality of solar/thermal panels (S1 and S2) are positioned at their maximum possible unfolded distances from said central body (B).

3. A spacecraft apparatus capable of being placed in a low Earth orbit (32) using a launch vehicle (L) comprising:

a central body (B) having a longitudinal axis; said central body (B) having a length along said longitudinal axis greater than a width transverse to said axis;

a plurality of antenna panels (A1–A9); said plurality of antenna panels (A1–A9) being stowed before launch in said launch vehicle (L) in stacked relationship against said central body (B) and deployed in space; and a plurality of hinges (H) for movably coupling said plurality of antenna panels (A1–A9) serially, each to another and to said central body (B) at an attachment point on an edge of each of said panels (A1–A9); each said attachment point being rotatable, in respect of a preceding attachment point, to a hinge locking angle in an elevation direction and displaced from said preceding attachment point by an offset angle in an azimuth direction;

said antenna panels (A1–A9) being uniquely positioned upon deployment by said hinge locking angle and said offset angle in combination to cover a desired footprint on the Earth's surface.

4. The spacecraft apparatus as claimed in claim 1 in which said plurality of antenna panels (A1–A9) and solar/thermal panels (S1–S2) being deployed in orbit take the shape of arms that extend away from said central body (B) in generally opposite directions, and reside at a maximum unfolded length.

5. The spacecraft apparatus as claimed in claim 1 in which said hinge locking angle includes an angle of 45 degrees and said offset angle includes an angle of 22.5 degrees.

6. The spacecraft apparatus as claimed in claim 1 in which said plurality of antenna panels (A1–A9) number at least nine, and said plurality of substantially circular, disc shaped solar/thermal panels (S1–S2) number at least two.

7. The spacecraft apparatus as claimed in claim 1 in which in which one or more said antenna panels (A1–A9) are arranged for use as an intersatellite communication link.

8. The spacecraft apparatus as claimed in claim 1 in which said plurality of solar/thermal panels (S1–S2) are placed as last panels on said arm, rotated about an axis parallel to said velocity vector (VD) of said satellite (42) and latched at a desired hinge locking angle.

9. A spacecraft apparatus capable of being placed in a low Earth orbit (32) using a launch vehicle (L), for providing communications among a constellation (CON) of communications satellites, among a plurality of portable (P), mobile (M), and fixed (F) terminals and gateways (G) and other satellites, said spacecraft having a velocity direction (VD) and a direction to the Nadir (ND) while in orbit, comprising:

a plurality of substantially circular, disc shaped antenna panels (A1–A9);

said plurality of antenna panels (A1–A9) including a plurality of phased array antennas (X);

each of said plurality of phased array antennas (X) projecting beams for communicating with said plurality of portable (P), mobile (M), and fixed (F) terminals and gateways (G) and other satellites;

a plurality of substantially circular, disc shaped solar/thermal panels (S1 and S2);

said plurality of solar/thermal panels (S1 and S2) including a plurality of solar arrays (Y) and a plurality of thermal radiators;

said plurality of solar arrays (Y) supplying electrical power to said satellite (42) and said plurality of thermal radiators carrying heat away from said satellite (42);

a central body (B) having a generally cylindrical shape and at least one flat face for receiving said plurality of antenna panels (A1–A9) and said plurality of solar/thermal panels (S1–S2) in a layered stack, perpendicular to said velocity direction (VD) when said satellite (42) is in a folded configuration;

a plurality of connecting cables (C); said plurality of connecting cables providing power, control and communications between said central body (B), said plurality of antenna panels (A1–A9), and said plurality of solar/thermal panels (S1 and S2);

a plurality of hinges (H);

a first one of said plurality of antenna panels (A1) being attached to said flat face of said central body (B) by one of said plurality of hinges (H) at an attachment point on an edge of said first antenna panel (A1), and each successive panel (A2–A9, S1–S2), proceeding serially to a last panel, being movably coupled to a preceding panel at an attachment point on an edge of said panel (A1–A9, S1–S2);

each said attachment point being displaced from a preceding attachment point by an offset angle in an azimuth direction, and rotatable from a preceding attachment point to a hinge locking angle in an elevation direction;

said plurality of antenna panels (A1–A9) and said plurality of solar/thermal panels (S1–S2) being deployed in orbit and taking a shape of an arm that extends away from said central body (B);

each one of said plurality of antenna panels (A1–A9) and each one of said plurality of solar/thermal panels (S1–S2) being uniquely positioned in said arm with respect to said direction to the Nadir (ND) by said hinge locking angle and said offset angle in combination;

said plurality of antenna panels (A1–A9), being deployed in orbit with said hinges (H) arranged at a desired said hinge locking angle and said offset angle, to cover a desired footprint area on the Earth's surface with said beams; and said plurality of solar/thermal panels, being deployed with said hinges (H) arranged at a desired said hinge locking angle and said offset angle, to achieve an optimal angle for solar energy collection and thermal radiation.

10. The spacecraft apparatus as claimed in claim 9 in which said plurality of antenna panels (A1–A9) and said plurality solar/thermal panels (S1–S2) being deployed in orbit, take the shape of arms that extend away from said central body (B) in generally opposite directions, and reside at a maximum unfolded length.

11. The spacecraft apparatus as claimed in claim 9 in which said hinge locking angle includes 45 degrees and said offset angle includes 22.5 degrees.

12. The spacecraft apparatus as claimed in claim 9 in which said plurality of antenna panels (A1–A9) number at least nine, and said plurality of solar/thermal panels (S1–S2) number at least two.

13. The spacecraft apparatus as claimed in claim 9 in which one or more of said antenna panels (A1–A9) are arranged for use as intersatellite communication links.

14. The spacecraft apparatus as claimed in claim 9 in which said plurality of substantially circular, disc shaped solar/thermal panels (S1–S2) are disposed as last panels on said arm, rotated about an axis parallel to said velocity direction (VD) of said satellite (42) and latched at a desired hinge locking angle.

15. A method for providing communications among a constellation (CON) of communications satellites in low Earth orbit (32), among a plurality of portable (P), mobile (M), and fixed (F) terminals and gateways (G) and other satellites, from a spacecraft (42) placed in a low Earth orbit (32), said spacecraft (42) having a velocity direction (VD) and a direction to the Nadir (ND) while in orbit, comprising the steps of:

providing a spacecraft (42) having a cylindrical central body (B); said cylindrical central body (B) having at least one flat end face;

stowing a plurality of substantially circular, disc-shaped antenna panels (A1–A9) and a plurality of substantially circular, disc shaped solar/thermal panels (S1–S2) in a layered stack which lies against said flat end face of said cylindrical body (B) and occupies a minimum possible folded length;

said plurality of substantially circular, disc-shaped antenna panels (A1–A9) having a plurality of phased array antennas (X) for projecting beams for communicating with said plurality of portable (P), mobile (M), and fixed (F) terminals and gateways (G) and other satellites;

said plurality of substantially circular, disc shaped solar/thermal panels (S1–S2) having a plurality of solar arrays (Y) for supplying electrical power to the spacecraft (42) and a plurality of thermal radiators for dissipating heat from the spacecraft (42);

movably coupling said antenna panels (A1–A9) and said plurality of substantially circular solar/thermal panels (S1–S2) each to another and to said central body (B), serially, with a plurality of hinges (H);

movably coupling a first antenna panel (A1) to a first flat face of said central body (B) with one of said plurality of hinges (H) at an attachment point on an edge of said first antenna panel (A1), and movably coupling each successive panel (A1–A9, S1–S2) to a preceding panel with one of said plurality of hinges (H) at an attachment point on an edge of said panel (A1–A9, S1–S2);

each one of said plurality of hinges (H) being displaced at each said attachment point from a preceding attachment point by an offset angle in an azimuth direction; each of said plurality of said hinges (H) rotating each said attachment point in respect of a preceding attachment point to a hinge locking angle in an elevation direction;

placing said spacecraft (42) in orbit and deploying said plurality of antenna panels (A1–A9) arranged to face toward the Earth and illuminate a footprint on the Earth's surface; and deploying said plurality of solar/thermal panels (S1–S2) arranged to place said solar array (Y) facing the Sun;

said plurality of antenna panels (A1–A9) and said plurality of solar/thermal panels (S1–S2) taking the shape of an arm that extends away from said central body (B) and resides at a maximum unfolded length;

positioning each one of said plurality of antenna panels (A1–A9) and each one of said plurality of solar/thermal panels (S1–S2) uniquely in said arm, with respect to said direction to the Nadir (ND), with said hinge locking angle and said offset angle in combination;

covering a desired footprint area with said beams and achieving an optimal angle for solar energy collection and thermal radiation by latching said hinges (H) at a desired said hinge locking angle and said offset angle.

16. The method for providing communications as claimed in claim 15, in which the step of deploying said plurality of antenna panels (A1–A9) arranged to face toward the Earth and illuminate a footprint, and deploying said plurality of solar/thermal panels (S1–S2) arranged to place said solar array (Y) facing the Sun, includes deploying said plurality of antenna panels (A1–A9) and said plurality of solar/thermal panels (S1–S2) in the shape of arms that extend away from said central body (B) in opposite directions and reside at a maximum unfolded length.

17. The spacecraft apparatus as claimed in claim 15 in which the step of covering a desired footprint area with said beams and achieving an optimal angle for solar energy collection and thermal radiation by latching said hinges (H) at a desired said hinge locking angle and said offset angle, includes latching said hinge locking angle at 45 degrees and said offset angle at 22.5 degrees.

18. The method for providing communications as claimed in claim 15 in which in which the step of stowing in a layered stack which lies against said flat end face of said cylindrical body (B) and occupies a minimum possible folded length, a plurality of substantially circular, disc-shaped antenna panels (A1–A9) and a plurality of substantially circular, disc shaped solar/thermal panels (S1–S2), includes stowing at least nine of said plurality of antenna panels (A1–A9), and at least two of said plurality of said solar/thermal panels (S1–S2).

19. The method for providing communications as claimed in claim 15 in which in which the step of deploying said plurality of antenna panels (A1–A9) arranged to face toward the Earth and illuminate a footprint on the Earth's surface, includes the additional step of arranging one or more of said antenna panels (A1–A9) for use as intersatellite communication links.

20. The method for providing communications as claimed in claim 15 in which the step of deploying said plurality of solar/thermal panels (S1–S2) arranged to place said solar array (Y) facing the Sun, further includes the step of arranging said solar/thermal panels (S1–S2) as last panels on said arm, rotating said panels about an axis parallel to said velocity direction (VD) of said satellite (42) and latching them at a desired said hinge locking angle.

* * * * *